US008970396B1

(12) United States Patent
Nohra

(10) Patent No.: US 8,970,396 B1

(45) Date of Patent: Mar. 3, 2015

(54) HOURMETER SYSTEM AND METHOD

(71) Applicant: Delta Systems, Inc., Streetsboro, OH (US)

(72) Inventor: Tanios Elias Nohra, Broadview Heights, OH (US)

(73) Assignee: Delta Systems, Inc., Streetsboro, OH (US)

( * ) Notice: Subject to any disclaimer, the term of this patent is extended or adjusted under 35 U.S.C. 154(b) by 0 days.

(21) Appl. No.: 13/960,084

(22) Filed: Aug. 6, 2013

Related U.S. Application Data

(63) Continuation of application No. 13/957,034, filed on Aug. 1, 2013, now abandoned.

(60) Provisional application No. 61/678,841, filed on Aug. 2, 2012.

(51) Int. Cl.
*G08B 21/00* (2006.01)
*B60Q 1/00* (2006.01)

(52) U.S. Cl.
USPC .................................. 340/870.16; 340/457.4

(58) Field of Classification Search
USPC ......... 340/438, 457, 457.4, 459, 461, 309.16, 340/309.7, 870.16; 180/53.8, 65.31, 65.8; 307/10.7, 18, 29; 702/63
See application file for complete search history.

(56) References Cited

U.S. PATENT DOCUMENTS

| | | | | |
|---|---|---|---|---|
| 6,614,361 | B1 * | 9/2003 | Kinugawa | 340/870.16 |
| 6,625,553 | B1 * | 9/2003 | Modgil | 702/63 |
| 7,019,668 | B2 * | 3/2006 | Kinugawa | 340/870.16 |
| 7,034,674 | B2 | 4/2006 | Harvey | |
| 7,154,814 | B2 | 12/2006 | Straka | |
| 7,164,214 | B2 * | 1/2007 | Eisenberger et al. | 307/29 |
| 2013/0343906 | A1 * | 12/2013 | Funke et al. | 417/10 |

* cited by examiner

*Primary Examiner* — Van T. Trieu

(74) *Attorney, Agent, or Firm* — Tarolli, Sundheim, Covell & Tummino LLP

(57) ABSTRACT

An hourmeter system and method for monitoring engine operation in power equipment. A programmable controller monitors and updates an indication of the running times of an engine. An interface circuit is coupled to the programmable controller and also coupled to a power source for starting the engine. The interface circuit includes a detector circuit for detecting presence of a periodic noise signal whose presence is indicative of operation of the engine. The programmable controller is programmed to accumulate times of engine operation in a memory and communicate those times of engine operation for display.

15 Claims, 12 Drawing Sheets

222

HOURMETER SYSTEM AND METHOD

CROSS REFERENCES TO RELATED APPLICATIONS

The following application claims priority to co-pending U.S. Nonprovisional patent application Ser. No. 13/957,034 filed Aug. 1, 2013 entitled HOURMETER SYSTEM AND METHOD, which claims priority to U.S. Provisional Patent Application Ser. No. 61/678,841 filed Aug. 2, 2012 entitled HOURMETER SYSTEM AND METHOD. The above-identified applications from which priority is claimed are incorporated herein by reference in their entireties for all purposes.

TECHNICAL FIELD

The present disclosure relates to an hourmeter system and method of operation, and more particularly, an hourmeter system for monitoring and measuring engine operation time in outdoor power equipment.

BACKGROUND

Engine operating time hourmeters are frequently used in outdoor power equipment. Outdoor power equipment includes, but is not limited to, riding lawn mowers, lawn and agricultural tractors, snowmobiles, snowblowers, jet skis, boats, all terrain vehicles, bulldozers, generators, and the like. Hourmeters among other things, let the owner and/or manufacturer of the power equipment monitor how long the engine has been operated, when the equipment is due for repair/maintenance service, and whether the equipment is still under warranty.

Further discussion relating to developments in the hourmeter are discussed in U.S. Pat. Nos. 7,154,814 and 7,034,674 (collectively "Patents"). The Patents are owned by the assignee of the present application and are incorporated herein by reference in their entirety.

SUMMARY

One example embodiment of the present disclosure includes an hourmeter system and method for monitoring engine operation in power equipment. A programmable controller monitors and updates an indication of the running times of an engine. An interface circuit coupled to the programmable controller and also coupled to a power source for starting the engine. The interface circuit includes a detector circuit for detecting presence of a periodic noise signal whose presence is indicative of operation of the engine. The programmable controller is programmed to accumulate times of engine operation in a memory and communicate those times of engine operation for display.

In one embodiment, the hourmeter system comprises a power line coupled to a power source of the power equipment, a first lead line having a first state, the first lead line comprising ignition detection circuitry coupled to the power line and a microcontroller, a second lead line having a second state, the second lead line comprising noise detection circuitry coupled to the power line and the microcontroller, a third lead line having battery voltage detection circuitry coupled to the power line and the microcontroller, and an hourmeter coupled to the microcontroller that is enabled when the first, second, and third states are activated, indicating engine operation in power equipment.

Another example embodiment of the present disclosure includes a method of measuring engine operation time for power equipment. The method comprises the steps of monitoring a power line for changes in voltage with a voltage monitoring circuit to provide a first signal to a microcontroller at a first input and monitoring the power line for signal noise with a signal noise circuit to provide a second signal to the microcontroller at a second input. These two inputs provide enough information for a microcontroller implemented hourmeter to measure engine operation time.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Referring now to the figures generally wherein like numbered features shown therein refer to like elements throughout unless otherwise noted. The present disclosure relates to an hourmeter system and method of operation, and more particularly, an hourmeter system for monitoring and measuring engine operation time in outdoor power equipment.

Figure 1:
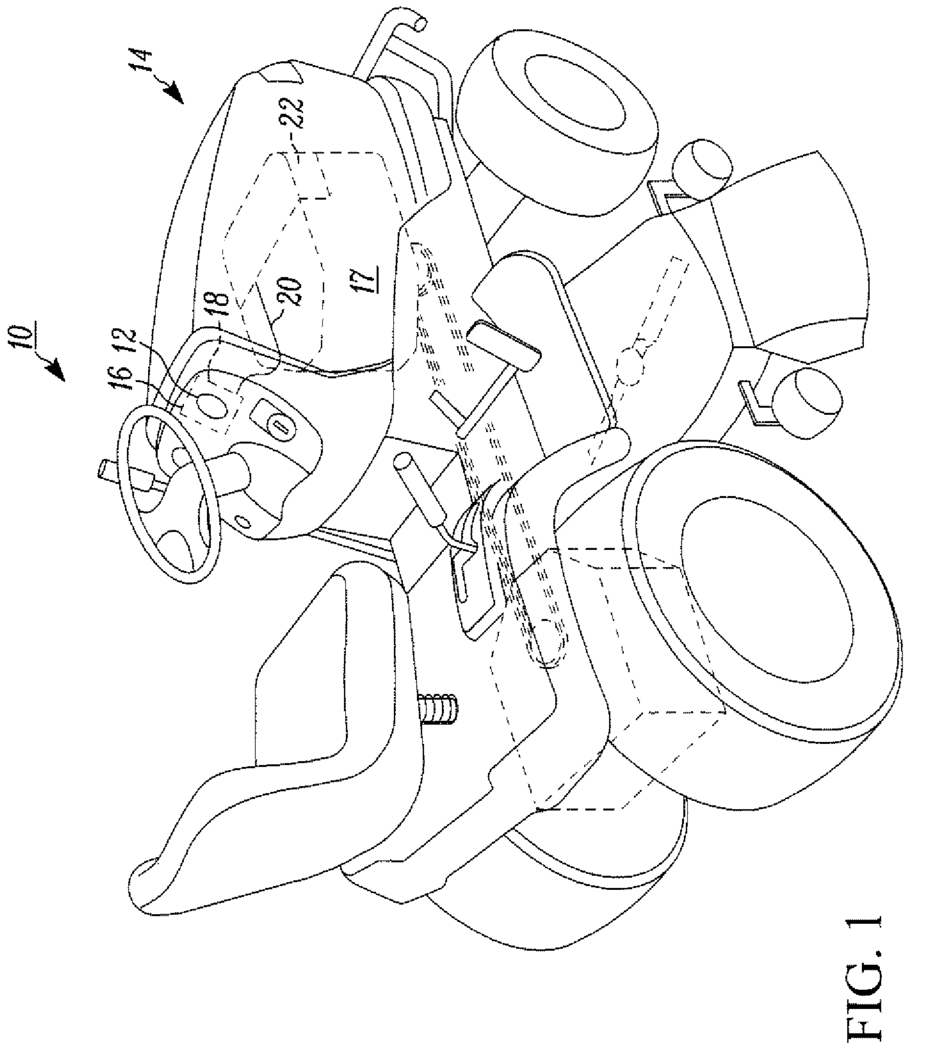
FIG. 1 illustrates one form of power equipment using an hourmeter system in accordance with one example embodiment of the present disclosure.
Figure 2:
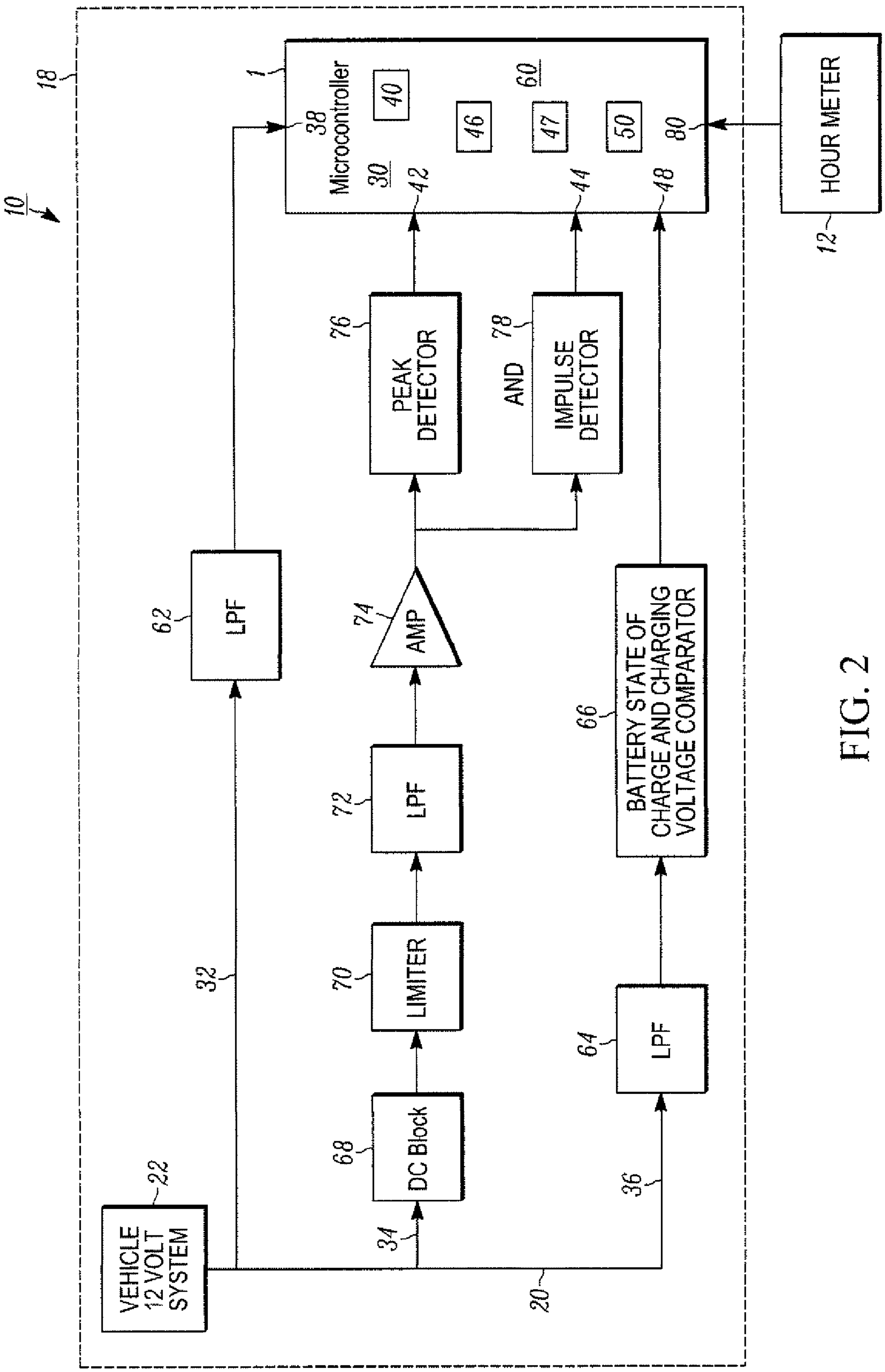
FIG. 2 is a block diagram illustrating the electrical construction of the hourmeter system in accordance with one example embodiment of the present disclosure.

FIGS. 1 and 2, and particularly FIG. 2 illustrate the electrical construction of an hourmeter system 10 in accordance with one example embodiment of the present disclosure. The hourmeter system 10 measures and displays power equipment engine operating time. A physical hourmeter 12 is typically located on the external profile of the power equipment 14, such as a dash panel 16 as seen in FIG. 1.

The hourmeter 12 displays, via a liquid crystal display an accumulated amount of time the engine 17 has been operated. Typically, the hour meter 12 is mounted on the dashboard 16 of outdoor power equipment 14 such as a tractor, snowmobile, riding lawn mower, personal water craft, or boat to inform the owner of the number of operation hours of the engine 17, since the power equipment was manufactured. However, it should be appreciated that the hourmeter system 10 of the present disclosure can be utilized with any type of internal combustion engine and is not limited to any particular type of equipment or vehicle.

For ease of installation and compactness, circuitry and the liquid crystal display of the hourmeter 12 is mounted to a printed circuit board 18. The circuit board 18, in turn, is conveniently plugged into a socket (not shown) disposed beneath the dashboard of the power equipment 14 and coupled to a power line 20 of a power source 22 of the power equipment.

The hourmeter system 10 of the present disclosure employs novel power supply signal analysis "PSSA" to advantageously assure accurate measurement and monitoring of the engine operation time. That is, the PSSA determines the engine state (ON/OFF) by monitoring and processing simultaneously in one example embodiment three distinguishable states of the power source 22. In the illustrated example embodiment, the power source 22 is a 12V battery.

The first state, or state 1 is a key-on state that is active, present, or in a first enabling condition when the power line 20 ranges between 12.6 VDC at full charge to 11.7 VDC at full discharge for an open-circuit. The second state or state 2 is a charging voltage state that is active, present, or in a second enabling condition when power line 20 rises to a voltage level between 13.8 VDC and 14.1V, because of the charge provided by a charging system, such as a generator. The third state or state 3 is an ignition impulse and/or generator noise state that is active, present, or in a third enabling condition when the power line 20 carries a superimposed noise signal.

As further discussed below, the three distinguishable states prevent the occurrence of false negative enabling of the hourmeter without the engine running. That is, state 1 could be present with the power equipment key in an "ON" position, but without the engine running. State 2 could be present with remote or a wall power battery charger charging the equipment battery without the engine running.

The PSSA advantageously discriminates, separates, compares, and analyzes each signal from all three states separately before determining the current engine state, and whether or not time measurement of the hourmeter 12 should begin, continue, or stop. In one example embodiment, a microcontroller 30 is used to collect and process the PSSA output signals and states, determining whether or not the engine is running and time should be accumulated on the hourmeter 12. In another example embodiment, an application specific integrated circuit "ASIC" is used to collect and process the PSSA output signals and states, determining whether or not the engine is running and time should be accumulated on the hourmeter 12.

Referring specifically to FIG. 2, a hourmeter system 10 is shown in accordance with one example embodiment of the present disclosure. The hourmeter system 10 comprises a power line 20 coupled to power source 22 that in the illustrated example embodiment comprises a battery. The hourmeter system 10 further comprises first 32, second 34, and third 36 lead lines, and a microcontroller 30. The leads lines 32, 34, and 36 are constructed in parallel and are coupled at a first end to the power line 20 and at a second end to an input/output pin of the microcontroller 30. The first, second, and third states are measured by first 32, second 34, and third 36 lead lines, respectively.

An input 38 of the microcontroller 30 monitors the first state, or state 1, which is a key-on state that is active or in a first enabling condition when the power line 20 ranges between 12.6 VDC at full charge to 11.7 VDC at full discharge for an open-circuit. The software or firmware 60 within the microcontroller 30 is programmed to a prescribed range 40 for monitoring state 1 at input 38. It should be appreciated by those skilled in the art that the prescribed range 40 could be modified as necessary based on, for example, load requirements and power source 22 size.

An input 48 of the microcontroller 30 monitors the second state or state 2, which is a charging voltage state that is active or in a second enabling condition when power line 20 rises to a prescribed voltage level 50, which in the illustrated example embodiment is between 13.8 VDC and 14.1V, because of the charge provided by a charging system, such as a generator. The software or firmware 60 within the microcontroller 30 is programmed to a prescribed range 50 for monitoring state 2 at input 48. It should be appreciated by those skilled in the art that the prescribed range 50 could be modified as necessary based on, for example, the size of the generator used with the power equipment.

Inputs 42 and 44 of the microcontroller 30 monitor the third state or state 3, which is an ignition impulse and generator noise state that is active or in a third enabling condition when the power line 20 carries a superimposed ignition or impulse noise. The software or firmware 60 within the microcontroller 30 is programmed to a prescribed frequency ranges 46 and 47 for the known frequency characteristics of the noise at respective inputs 42 and 44, respectively. It should be appreciated by those skilled in the art that the prescribed frequency ranges 46, 47 could be modified as necessary based on the electrical noise characteristic of the specific type of power equipment.

Lead line 32 further comprises a low-pass filter 62 for signal conditioning input 38 to the microcontroller 30. In one example embodiment, the low-pass filter 62 is an RC analog circuit.

Lead line 36 further comprises a low-pass filter 64 for signal conditioning input 48 to the microcontroller 30. In one example embodiment, the low-pass filter 64 is an RC analog circuit. Lead line 36 also comprises power source 22 state of charge and charging voltage comparator.

Lead line 34 further comprises a DC block 68, limiter 70, low-pass filter 72, and amplifier 74 in series for signal conditioning inputs 42 and 44 to the microcontroller 30. In one example embodiment, the low-pass filter 72 is an RC analog circuit. Lead line 34 also comprises peak detector 76 and impulse detector 78 in parallel, coupled to inputs 42 and 44, respectively. The peak detector 76 is condition to detect operation of generator noise.

If the inputs 38, 48, and at least one of 42 and 44 receive a signal that the states are enabled or active, then the engine 17 is operating and an output signal at output 80 of the microcontroller 30 is generated, enabling operation of the hourmeter 12. This advantageously prevents false operation of the hourmeter 12. That is, the hourmeter 12 will not operate if state 1 alone is enabled, that is the key is left in the ON position. Similarly, the hourmeter 12 will not operate if the state 2 alone enabled, preventing the hourmeter from running if the battery is being charge or remote noise is detected.

Figure 3:
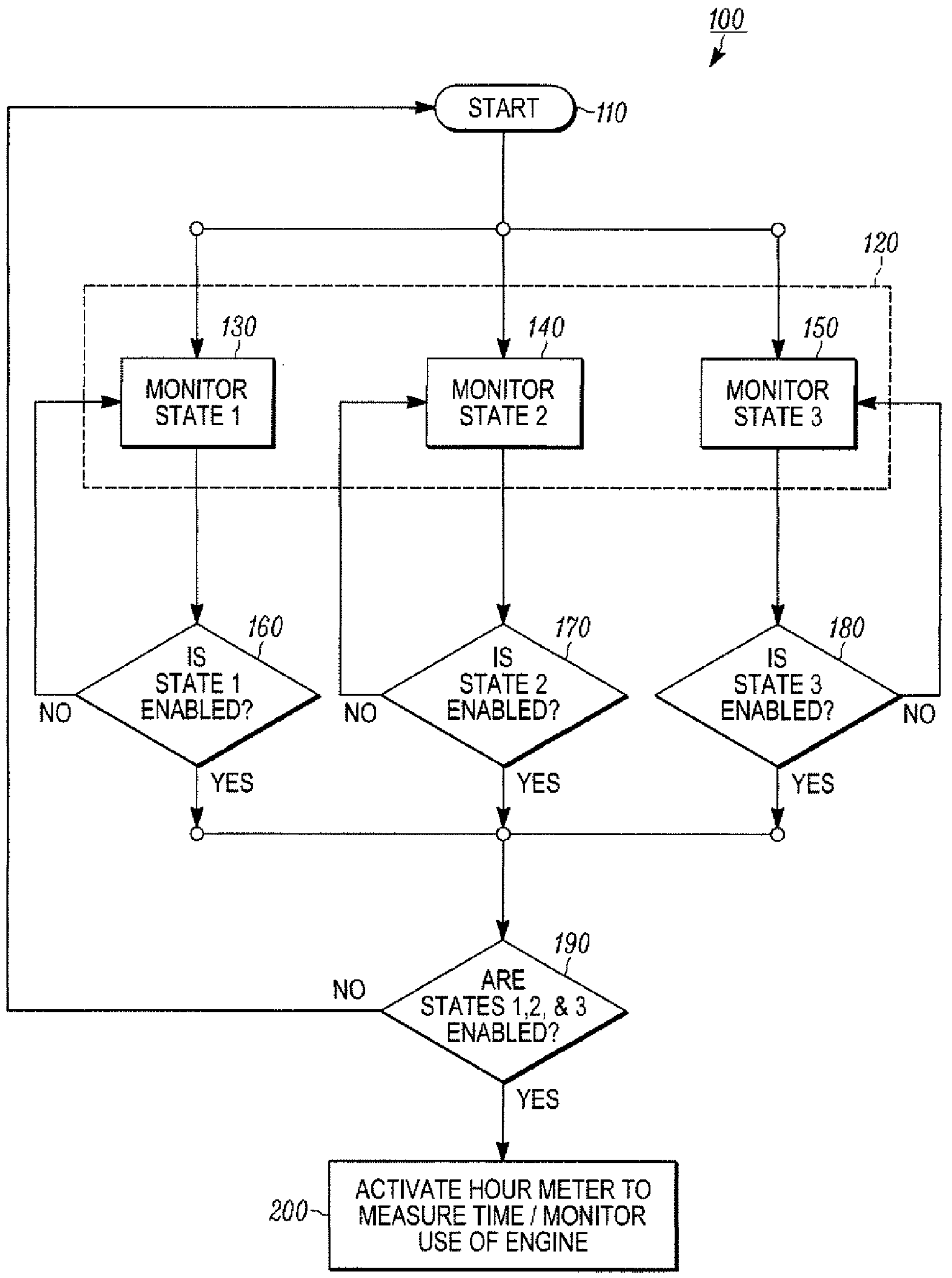
FIG. 3 is a flow diagram illustrating the operation of the hourmeter system in accordance with one example embodiment of the present disclosure.

FIG. 3 illustrates a flow diagram illustrating an operation 100 of the hourmeter system 10 in accordance with one example embodiment of the present disclosure. In one example embodiment, the flow diagram represents the logic process of software or firmware located in the microcontroller 30. The operation 100 is initiated at 110 in which a plurality of states are monitored. In one example embodiment, the plurality of states are processed and monitored at 120 simultaneously.

A first state 130 represents a key-on state that is monitored from power line 20. The first state 130 is active or in a first enabling condition at determination step 160 when a power line 20 ranges between a prescribed voltage range at full discharge for an open-circuit. The prescribed voltage range is programmed into the firmware or software of the microcontroller 30.

A second state 140 is a charging voltage state that is monitored from power line 20. The second state 120 is active or in a second enabling condition at determination step 170 when power line 20 rises to a prescribed voltage level range that is above the power source 22 voltage. The prescribed voltage level range rises above the power source voltage because of the charging system voltage provided by a charging system, such as a generator. The prescribed voltage level range is programmed into the firmware or software of the microcontroller 30.

A third state 150 is an ignition impulse and/or generator noise state that is monitored from power line 20. The third state is active or in a third enabling condition at determination step 180 when the power line 20 carries a superimposed noise. Such noise frequency or frequency range once isolated is captured as a prescribed frequency or prescribed frequency range that is programmed into the firmware or software of the microcontroller 30.

If the hourmeter system 10 operation 100 at the determination steps 160, 170, and 180 are active, i.e. in the affirmative, the digital hourmeter 12 is enabled at 190/200 to count or track the engine operation time. If the hourmeter system 10 operation 100 at any one of the determination steps 160, 170, and 180 are negative, the process 100 returns to the operation initiation 110. The signal in determination steps 160, 170, and 180 need to be enabled to activate the tracking or counting of engine operation time.

Advantageously, the process 100 only requires coupling or monitoring of the power source 22 power line 20, which is the same terminal (connection) needed to provide power to the power apparatus 14. Hence, no extra installation, interface, terminal, or connection is needed for the hourmeter 12 or hourmeter system 10 to function and operate.

Second Alternate Example Embodiment

A second alternate example embodiment of a system 200 for monitoring operation of an engine in power equipment is described in reference to FIGS. 4-12. This second alternate example embodiment includes a programmable controller 210 for monitoring a status of the engine 17 such as the engine of a riding lawn mower depicted in FIG. 1 and storing an indication and/or communication of the running times of the engine. An interface circuit 220 is coupled to the programmable controller 210 and also coupled to a power source, such as the battery 22 of FIG. 5 for starting the engine 17. The interface circuit 220 includes a detector circuit 222 for detecting presence of a periodic noise signal whose presence is indicative of operation of the engine. The representative programmable controller 210 is a Model STM8 commercially available from STmicroelectronics and includes a memory for accumulating times of engine operation and also communicating these accumulated times for display on a visual display 224 of the hourmeter 12.

Figure 5:
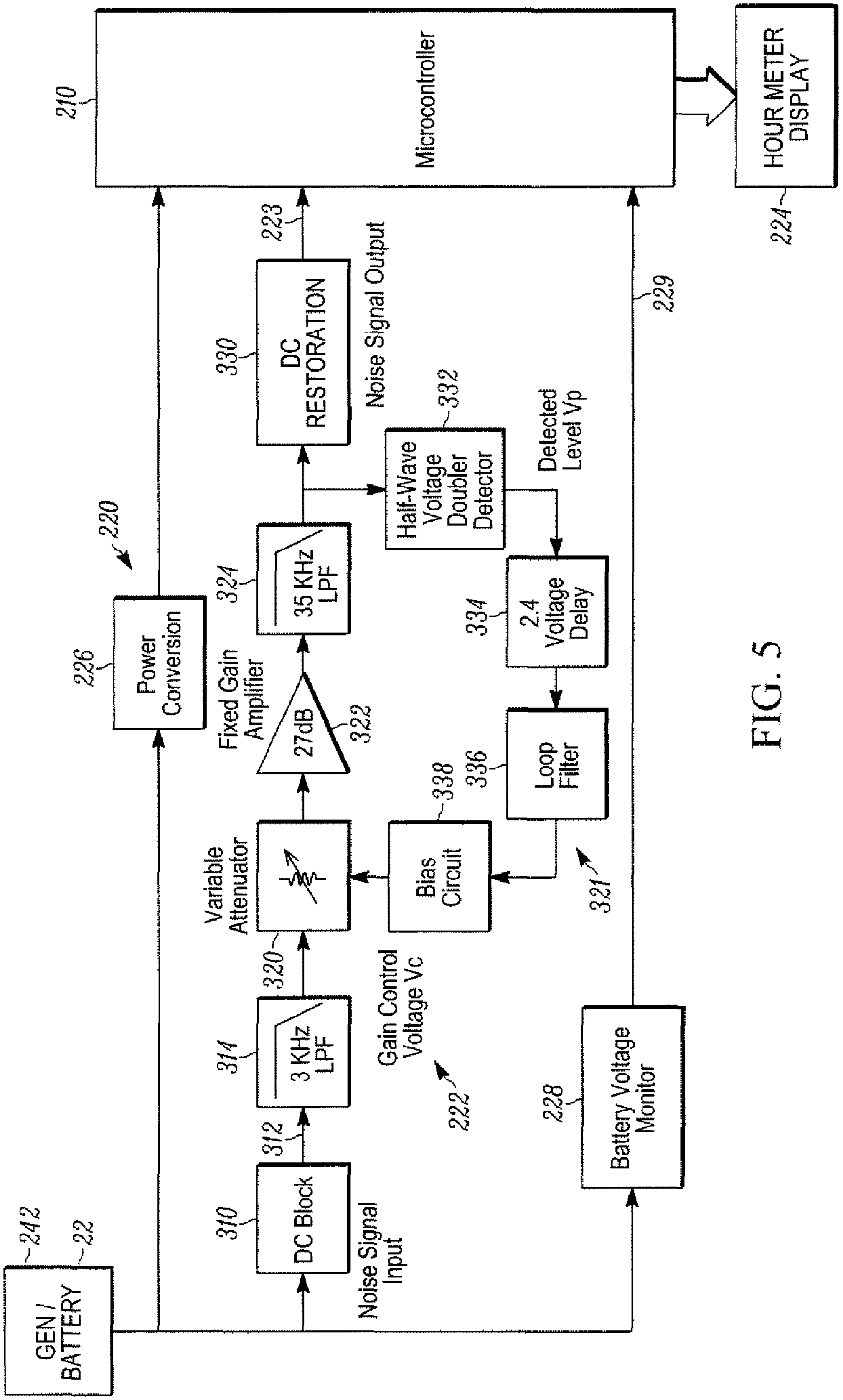
FIG. 5 is a block diagram of the electrical construction of an hourmeter system in accordance with a second example embodiment of the present disclosure.
Figure 6:
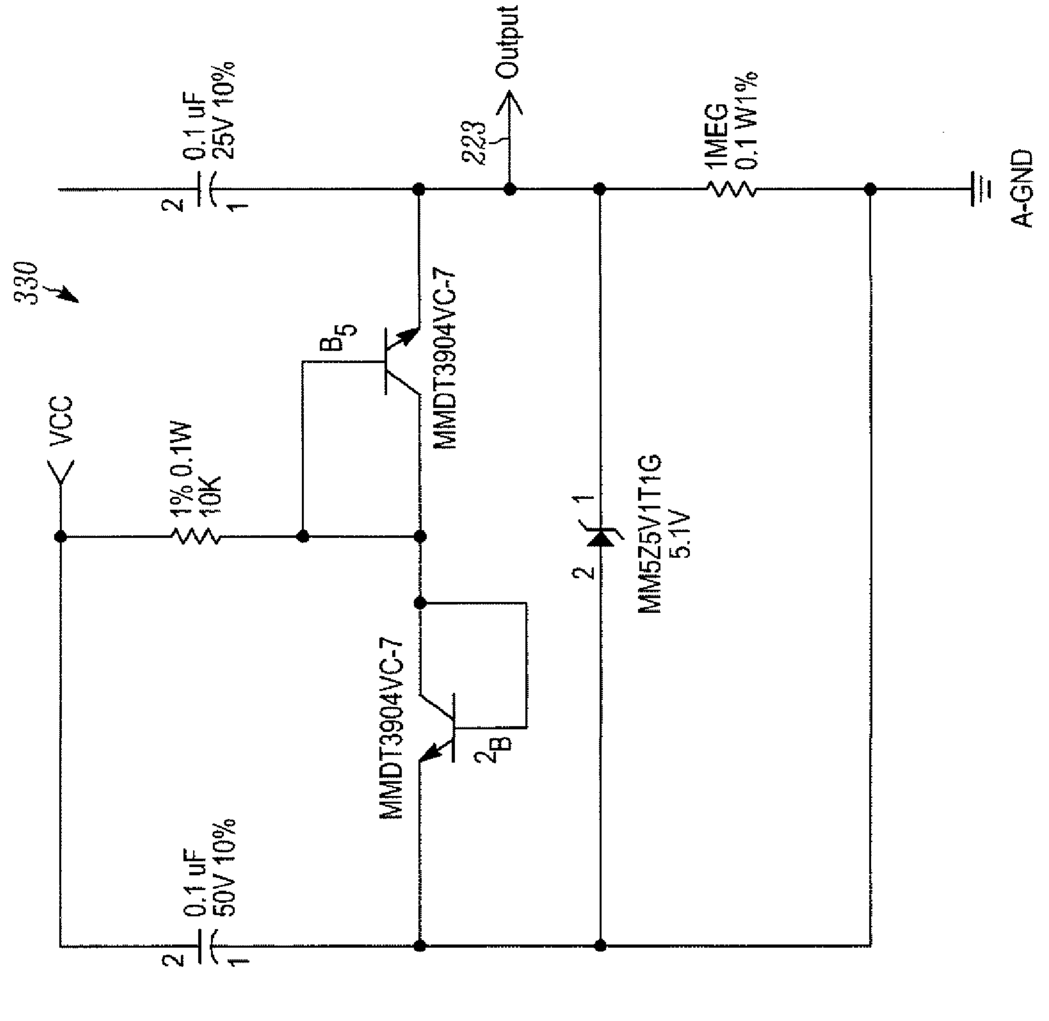
FIGS. 6-11 are more detailed schematics of a noise detector that forms part of the FIG. 5 block diagram.
Figure 7:
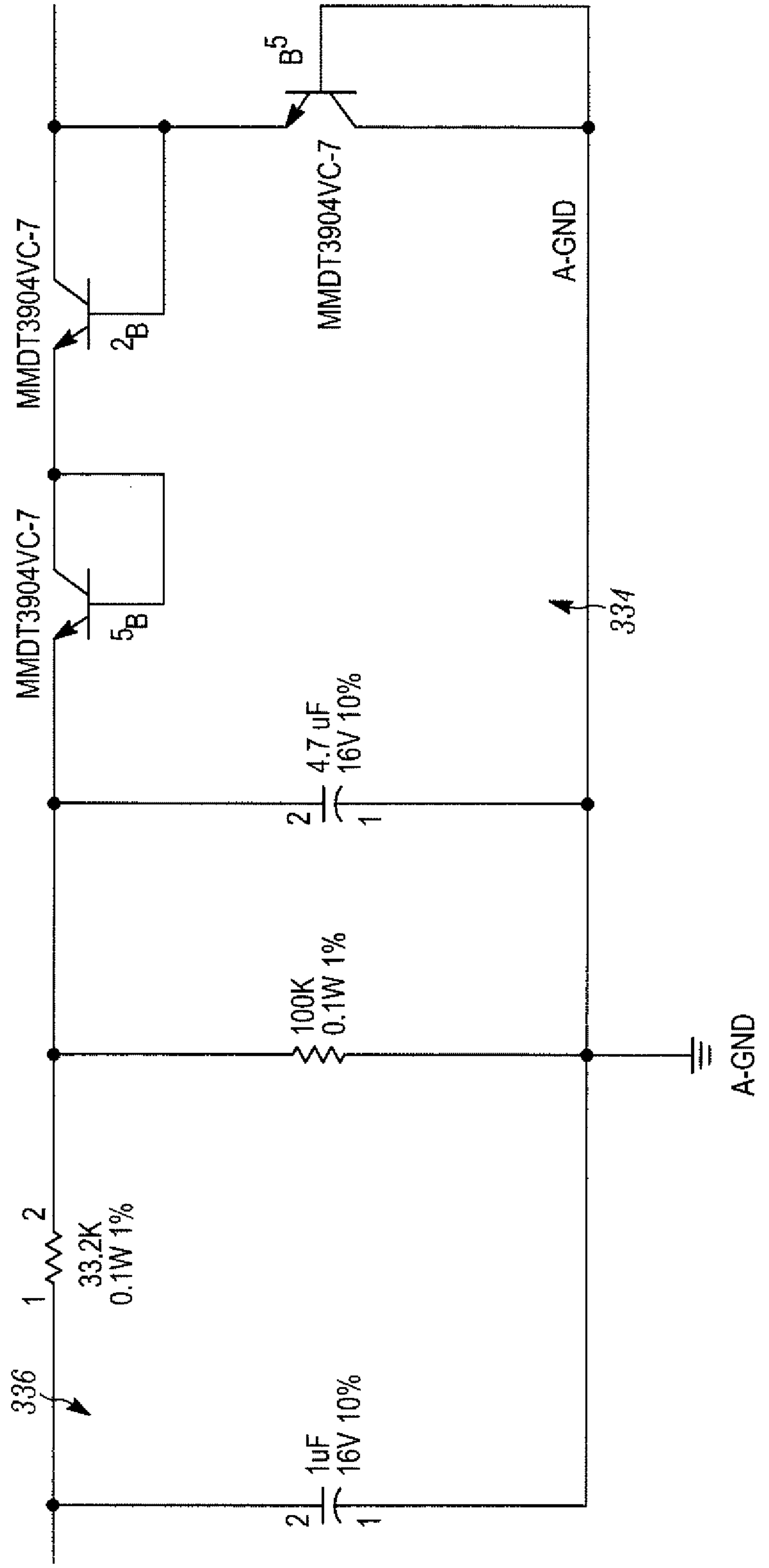
Figure 8:
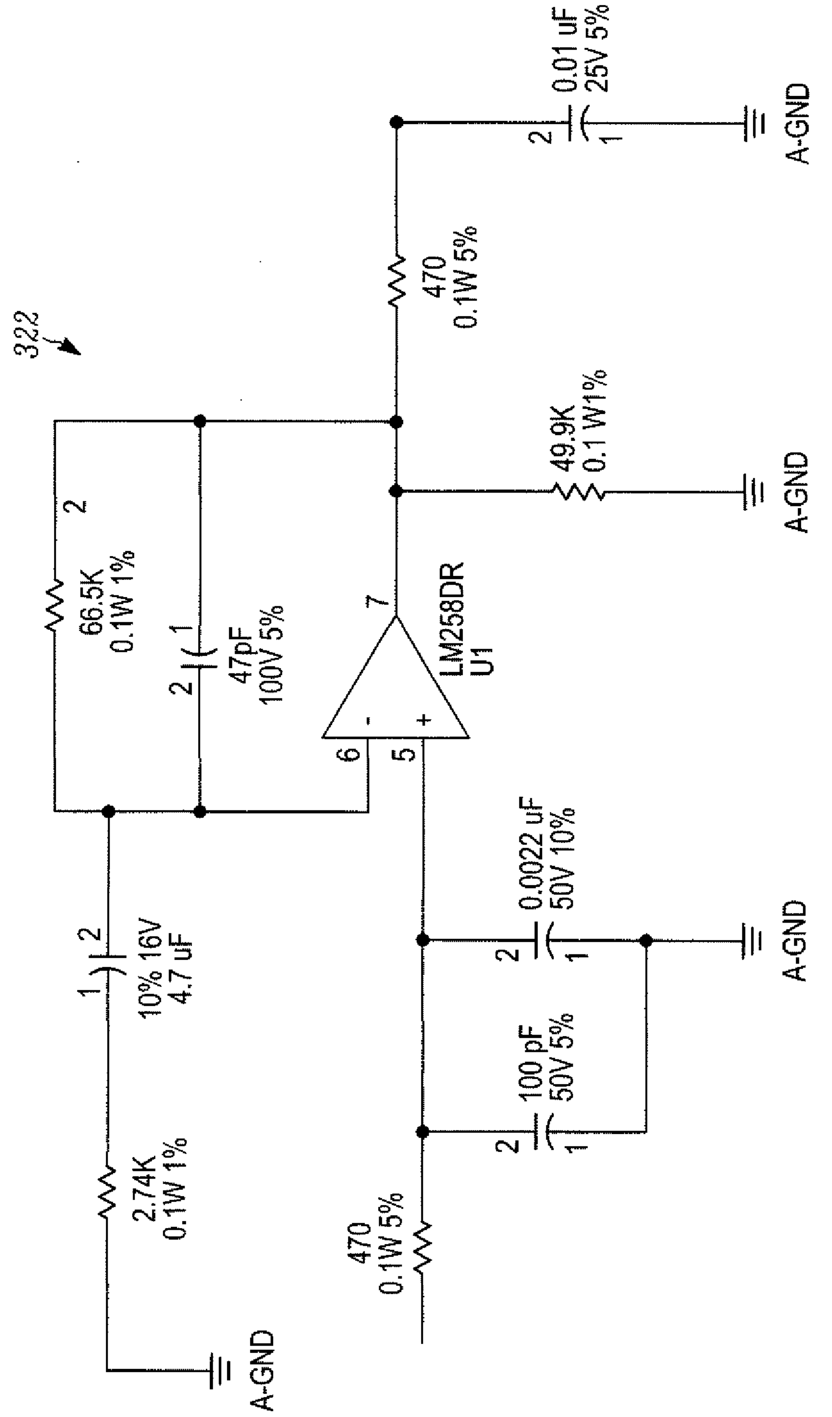
Figure 9:
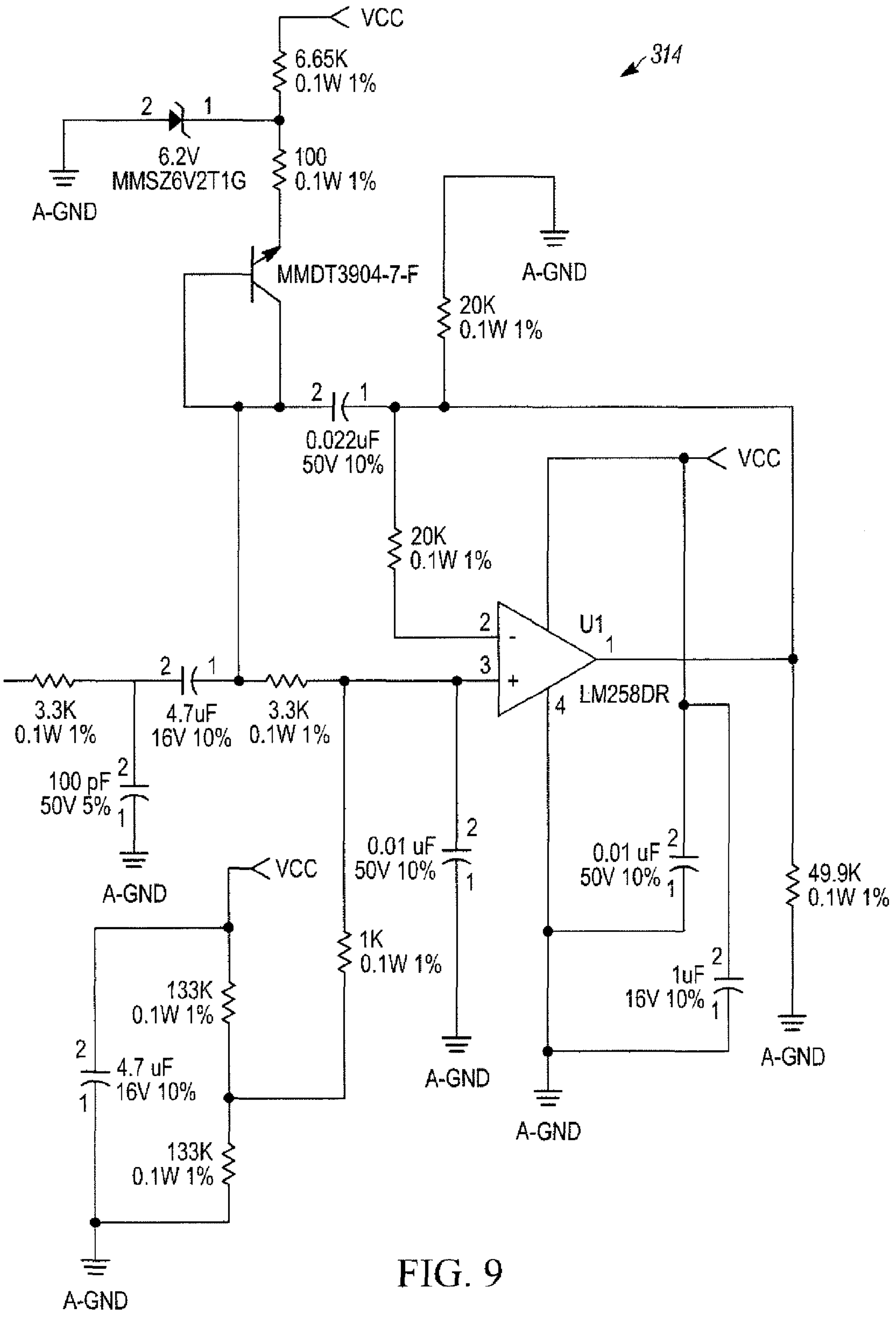
Figure 10:
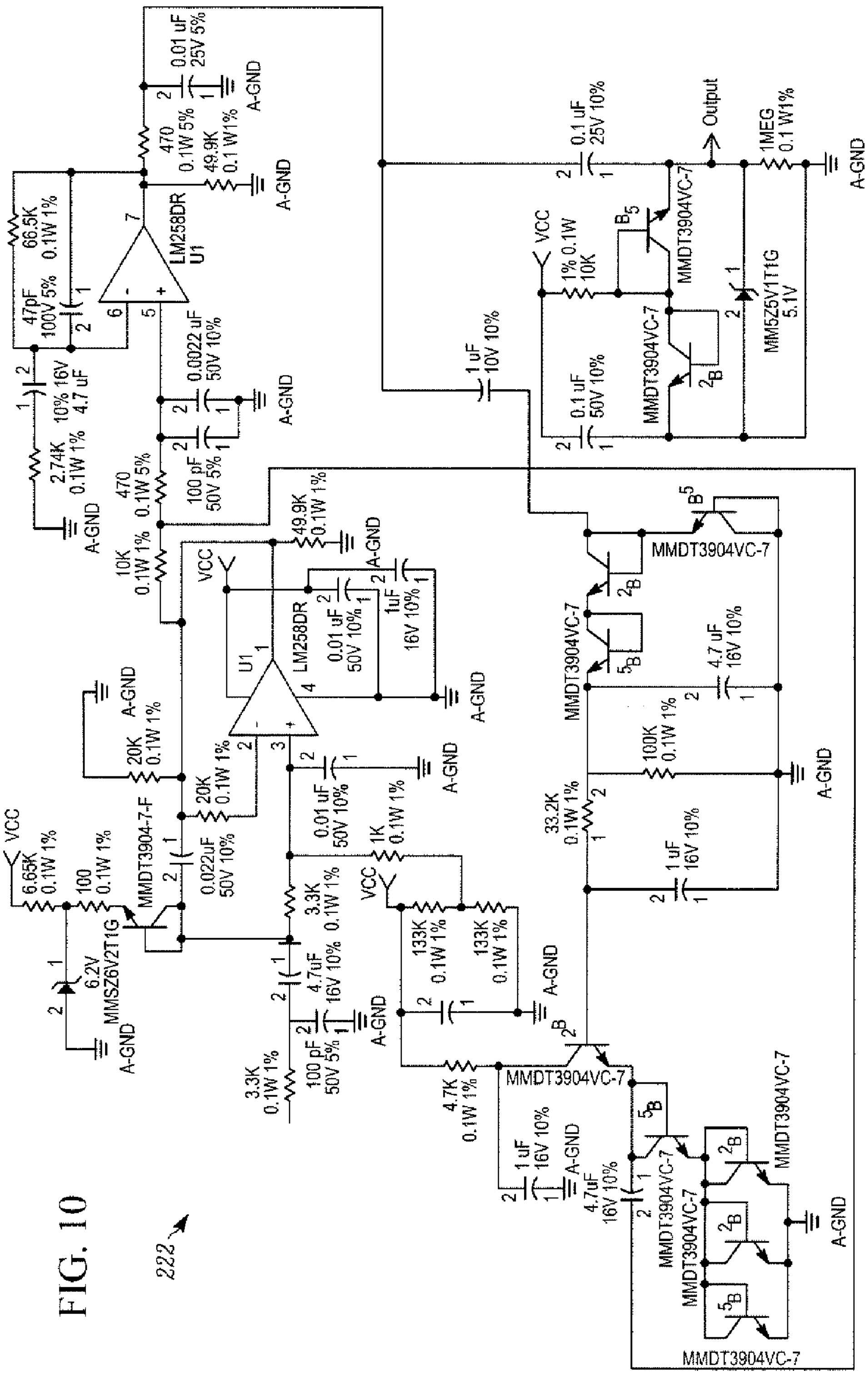
Figure 11:
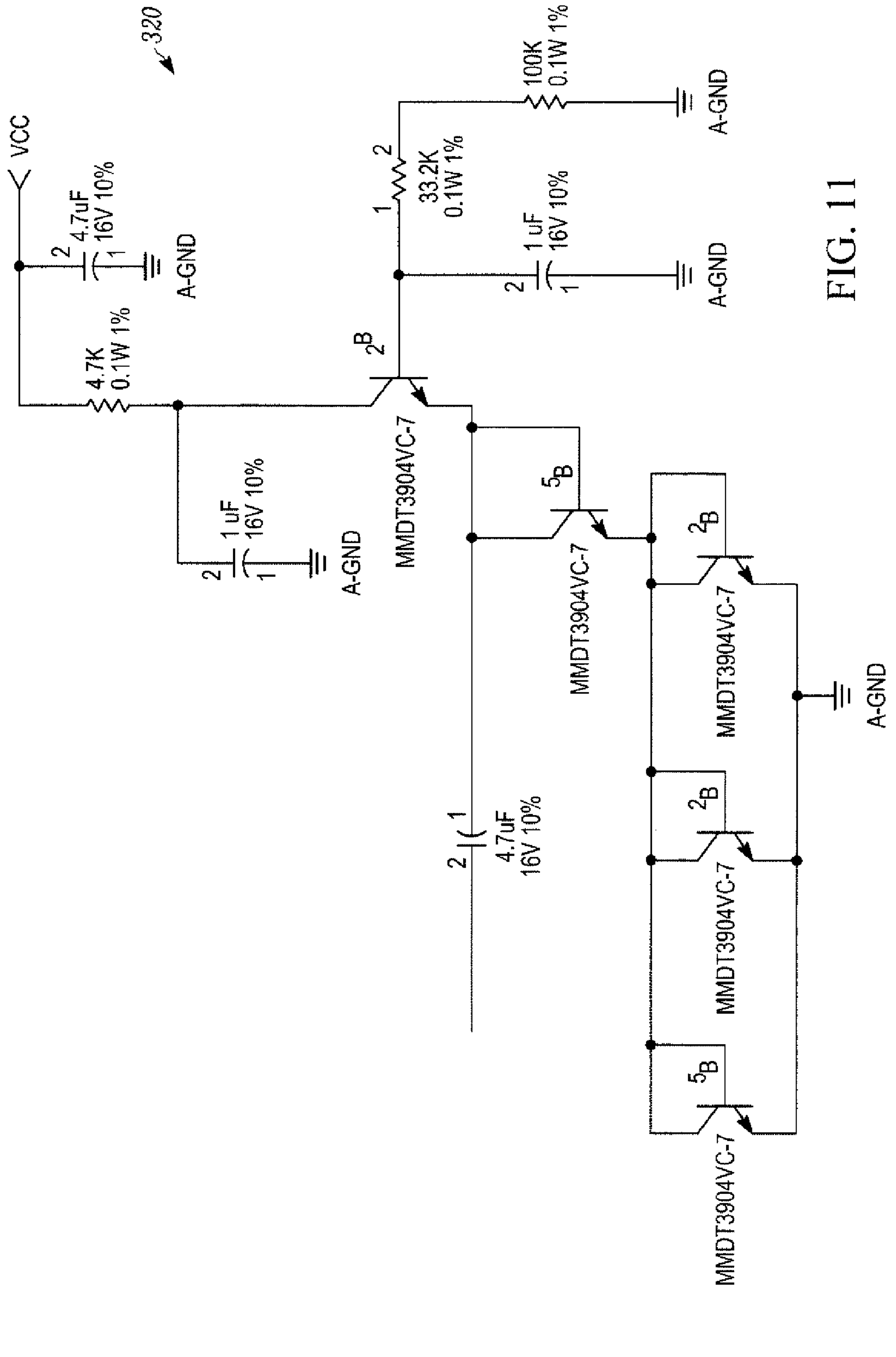

As depicted in FIG. 5, A power conversion circuit 226 is used to power the programmable controller. This circuit 226 drops the battery voltage from the battery 22 to a value for powering the controller. The rest of the system has a separate power source similar to the circuit 226. A battery voltage monitor 228 is also coupled to the battery 22 and includes an input 229 to the controller for monitoring battery voltage. In the exemplary embodiment, the voltage at the input 229 is one fifth the voltage appearing at the high (+) side of the battery. As seen below, the battery voltage is used by the controller to detect an operating state of the system 200 and more particularly is used in transitioning from a state in which the engine is deemed to be "not running" to a state in which the engine is running and therefore the accumulated run time of the engine should be updated.

Figure 4:
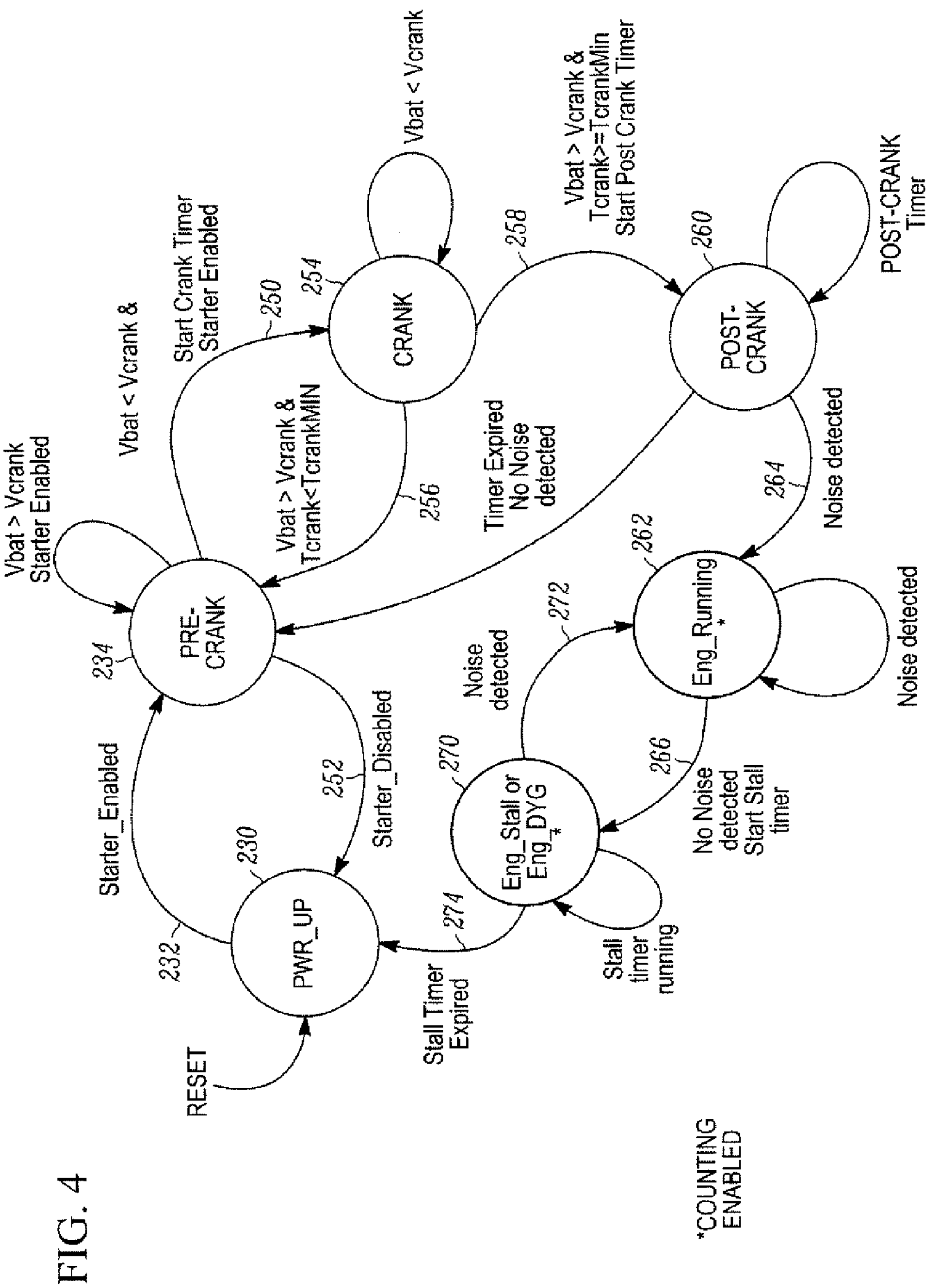
FIG. 4 is a state diagram of operating states of a controller used in implementing a second example embodiment of the present disclosure.

FIG. 4 depicts a state diagram for program instructions executing on the controller 210 in characterizing the system 200 and more particularly in determining when the engine is running. The controller 210 categorizes the system 200 into a sequence of operating states based on monitored conditions.

An initial operating state 230 (FIG. 4) is a state in which the controller 210 is powered by the battery 22 and is waiting for an event to occur which would cause the controller 210 to transition to another state depicted in the state diagram of FIG. 4. In the exemplary embodiment, a transition path 232 from the initial power up state 230 to a so called pre-crank state 234 is made in response to receipt by the controller of a starter enabled signal. This starter enabled signal can originate from either an ignition switch or from an additional controller communicating with the controller 210.

Figure 12:
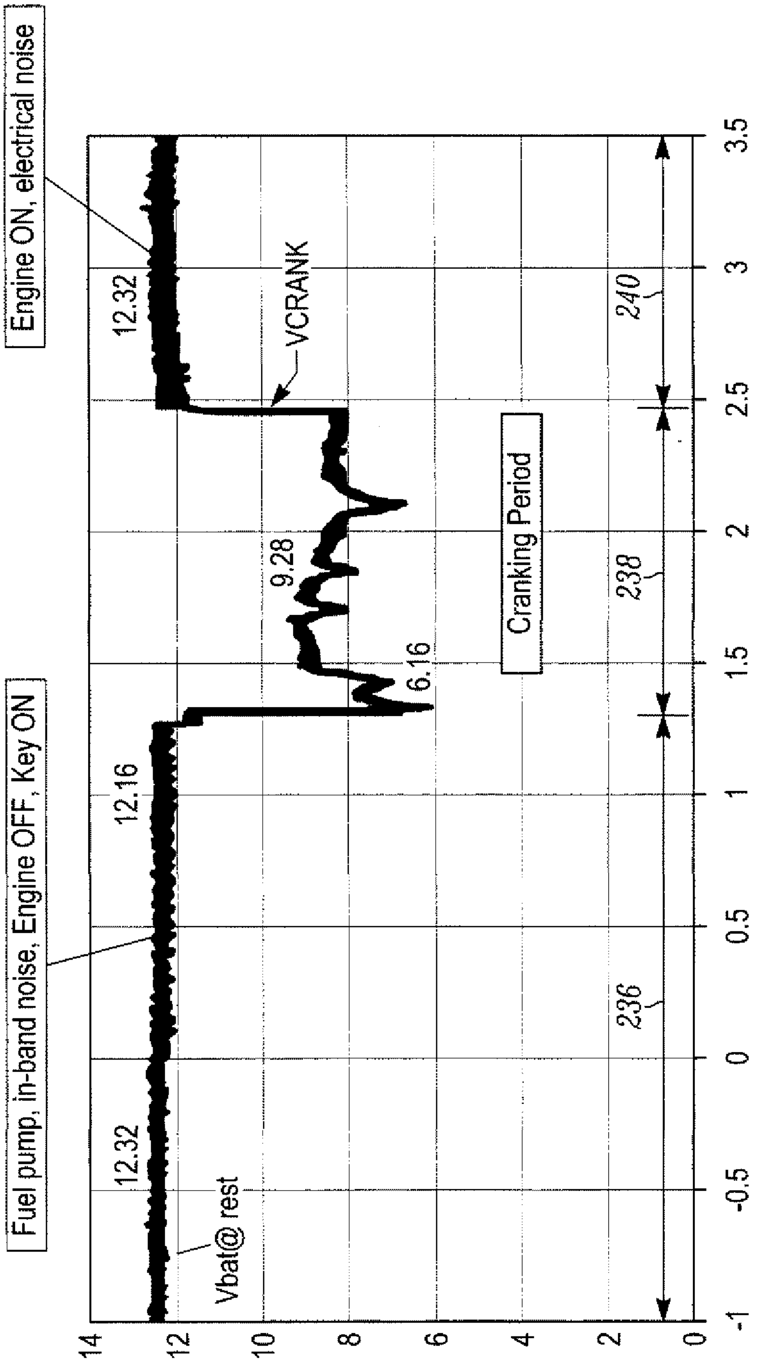
FIG. 12 is a voltage versus time depiction of the sensed battery voltage during starting of an engine.

The pre-crank state 234 is entered upon receipt of a starter enabled signal. The term "crank" originates from a time in which motor vehicles were hand cranked by a motorist with a handle turned at right angles to a shaft. In more modern equipment the cranking for initiating combustion within an internal combustion chamber is performed by a starter motor (not shown). FIG. 12 is a depiction of time versus voltage on the high side (+) of the battery 22 depicting an interval 236 before a crank state is entered, an interval 238 while the engine is cranked by the starter motor, and an interval 240 after the engine is started and hence, as the battery 22 begins charging due to the presence of a generator output voltage and periodic noise signal from a generator 242 which in combination with the battery power the circuit 220 (see FIG. 5). The controller 210 maintains its characterization of the system 200 in the pre-crank state 234 so long as the battery voltage as sensed at the input 229 is greater than a threshold Vcrank and the starter enabled signal is still present.

Two paths 250, 252 cause the controller 200 to exit the pre-crank state 234. One path 250 leads to a starting or crank state 254 which the, controller 210 transitions to as the engine is starting. A second path 252 leads back to the intial or power up state 230, if the starter enabled signal is removed before engine cranking begins. The controller 210 transitions to the crank state 254 by a transition path 250 traversed on a decision that is based on sensed battery voltage. More particularly, the crank state 254 can be entered only when the battery voltage as sensed at the input 229 is less than a "Vcrank" threshold which is a constant programmed into the controller operating system. This constant is dependent on the system characteristics, but for one riding lawn mower system Vcrank is about 10 volts.

A crank timer variable Tcrank is started when the controller enters the crank state 254 and is updated while in that state. This timer variable is compared to a fixed or constant value of TcrankMIN programmed into the controller when the battery voltage rises above VcrankMin. The comparison between Tcrank and TcrankMIN is to avoid false passage through the crank state 254 due to transitory conditions within the system which might trigger entry to the crank state if this state were based on battery voltage alone. Such transitory drops in sensed battery voltage might be due to use and presence of accessories' noise in the system not related to starting of the engine. As an example, assume the battery voltage drops below the threshold Vcrank but for only a short time. When the battery voltage drops, the controller sets the crank timer Tcrank to zero and the controller enters the crank state 254. However, the drop in battery voltage is due to a transitory condition and immediately the battery voltage rises. Since the crank timer Tcrank just started, conditions are appropriate (Vbat>Vcrank && Tcrank<TcrankMin) for the controller to exit the crank state 254 along the exit path 256 and return to the pre-crank state 234.

The controller 210 enters a post crank state 260 based on sensed battery voltage at the input 229 to the controller and the value of the timer Tcrank that the controller initiated when the path 250 was traversed to the crank state 254. As seen in the FIG. 12 depiction, once the engine starts the battery voltage will again rise above the Vcrank value. However, this battery voltage comparison must also be accompanied by the timer Tcrank reaching a value greater than or equal to TcrankMIN. If both conditions are satisfied, the controller exits the crank state along the path 258 and enters the post crank state 260 after starting a post crank timer. Hopefully, the engine cranking by the starter motor has caused the engine to start, but the controller must account for the possibility that the engine does not start. The post crank timer counts to an upper limit or expiration value while the controller monitors an input 223 coupled to the battery through the detector circuit 222.

Evaluation of signals on the high side of the battery has resulted in a better understanding of a signature of the electrical signals on the high side when the engine is running. The detection circuit 222 provides an analysis of noise on the high (+) battery terminal that is referred to herein as power system spectrum analysis or PSSA. In brief, the PSSA implemented by the detection circuit allows the controller 210 to detect an engine running condition by monitoring the electrical noise produced by the running engine in the 12 volt power system of the device. This noise is produced and comprises a signature of the combination of the engine stator, voltage generator, and voltage regulator for example of the riding lawn mower depicted in FIG. 1.

Returning to the state diagram of FIG. 4, a engine running state 262 is entered by the controller along a path 264 from the post crank state 260, if a noise signal representative of a running engine is sensed at the input 223. While in the engine running state, the controller updates a variable indicating engine run time since an initial or first start up of the engine. This variable is typically stored in non-volatile memory so that in the event the controller is disconnected from the battery, the run time of the engine is maintained. Most commonly, the controller exits the engine running state 262 when the operator turns an ignition switch to an off position and the engine stops. When this occurs the signature of a running engine is no longer present at the input 223 and the state 262 is exited along the transition path 266.

The controller enters an engine stall state 270 for a brief period of one to two seconds. If during that short interval the signature of a running engine is again sensed at the input 223 the controller transitions along the path 272 back to the engine running state 262. This sequence occurs when the engine briefly stalls and is hopefully not a frequent occurrence. In the disclosed example embodiment, the controller continues to increment the engine run time variable during the time spent in the engine stall state 270. If the stall period timer of one to two seconds expires without reappearance of a noise signature at the input 223 the controller returns via the transition path 274 to its initial or the power up state 230.

Returning to the block diagram of FIG. 5, additional details of the detector circuit 222 are described. The detector is connected to the battery by means of a blocking circuit 310 that impedes a direct current component of a battery signal from passing through the detector. An output 312 from the blocking circuit 310 is coupled to a first frequency attenuating filter 314 that attenuates signals passing through the blocking circuit having a frequency higher than a first threshold from passing through the detector. In accordance with the exemplary embodiment the threshold is 3000 hertz (3 khz) and the filter is also referred to as a low band pass filter since frequencies above 3 khz are blocked and attenuated.

A variable attenuator 320 is coupled to the first frequency attenuating filter 314 for attenuating signals from the first frequency attenuating filter 314 in a manner that is dependent on or based on the magnitude of signals from the first frequency attenuating filter. At low engine speeds (low rpm), the signals subsequent to the filter 314 tend to be relatively small in value. As the engine speeds increase (higher rpm) the size of the signals is larger. The variable attenuator 320 makes these signals more uniform in size due to operation of a feedback loop 321, which implements automatic gain control. An output from the variable attenuator 320 passes through a constant gain amplifier 322 to a second frequency attenuating filter 324. This second frequency attenuating filter impedes signals of a frequency greater than the first filter threshold (approx. 3 khz) passing through the detector from reaching the controller. Although higher frequency signals are attenuated by the first low pass filter 314, some higher frequency signals bypass this filter and the second frequency attenuating filter 324 blocks these unwanted signals. An output from the second filter is level shifted by a dc restoration circuit 330 so that an A/D converter within the controller only receives positive voltage signals at the input 223.

The combination of the two filters 314, 324, variable attenuator 320 and constant gain amplifier 322 constitute the forward path. The feedback loop portion of the detector 222 includes a half wave voltage doubler 332, which rectifies and shapes the signal output from the filter 324. Next, a voltage delay circuit 334 only acts on signals greater than 2.4 volts and for signals less than this threshold, the feedback loop acts like a open circuit and prevents the automatic gain control from engaging signals less than 2.4 volt at the output. A loop filter 336 reduces noise in the feedback loop 321 and the bias circuit 338 is a standard circuit for biasing the attenuator. FIGS. 6-11 depict circuit components that make up the detector 222 in greater detail.

A signal at the input to the controller has a well defined and discernable signature when the engine is running. A sequence of positive pulses appear at the input 223 and the controller receives those pulses which are analyzed after being converted to a digital number by the A/D converter internal to the controller. The controller continuously compares the received pulses' amplitude and period to a present voltage (about 0.85 volts or more) and time (about 200 microseconds or lower) thresholds. In the absence of the noise from a running or operating engine, the input signal at the controller input 223 is a very small noise level below the preset voltage threshold.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An hourmeter system for monitoring engine run time intervals in power equipment, the hourmeter system comprising:

a power line coupled to a power source of the power equipment;

a microcontroller powered by the power source for monitoring an operating status of the engine and accumulating run time intervals of the engine;

a first lead line coupling the power line to an ignition detection circuitry providing a first engine run state characterizing signal coupled to said microcontroller;

a second lead line coupling the power line to a noise detection circuit providing a second engine run state characterizing signal coupled to said microcontroller;

a third lead line coupling the power line to a battery voltage detection circuit providing a third engine run state characterizing signal coupled to said microcontroller; and an hourmeter coupled to said microcontroller that is enabled to accumulate engine run time intervals when said first, second, and third engine run state characterizing signals indicate said engine is running.

2. A method of measuring engine run times for power equipment, the method comprising the steps of:

providing a power source for starting the engine and coupling a power line from the power source to a vehicle starter;

monitoring said power line for changes in voltage with a voltage monitoring circuit to provide a first signal to a microcontroller at a first input;

monitoring said power line for signal noise with a signal noise detection circuit to provide a second signal to said microcontroller at a second input;

monitoring said power line for power source charging with a charging voltage comparator circuit to provide a third signal to said microcontroller at a third input;

enabling an hourmeter to measure engine run time when all three of said monitoring conditions are present as indicated by the three inputs to said microcontroller; and terminating the measurement of engine run time when any one of said monitoring conditions is not present.

3. The method of measuring engine run time of claim 2 wherein power source comprises a generator and wherein said signal noise circuit monitors generator operation noise.

4. A system for monitoring operation of an engine in power equipment comprising:

a programmable controller for monitoring a status of the engine and updating an indication of the running times of said engine; and interface circuitry coupled to the programmable controller and also coupled to a power source for starting the engine, said interface circuit comprising a detector circuit for detecting a presence of a periodic signal whose presence is indicative of operation of the engine wherein said detector circuit comprises a low frequency detector for detecting signals below a first cutoff frequency indicative of a running engine;

said programmable controller programmed to accumulate times of engine run times in a memory and communicate said times of engine run time for display in response to receipt of an indication of an output of the low frequency detector that said engine is running.

5. The system of claim 4 wherein the interface circuitry is coupled to a battery whose voltage is monitored by the programmable controller to distinguish between a starting condition of the engine and a operation condition of the engine.

6. The system of claim 4 additionally comprising a battery, a starter motor and a voltage generator for charging the battery during operation of the engine and a voltage regulator for regulating voltage applied to the battery from the voltage generator.

7. The system of claim 4 wherein the low frequency detector discriminates between signals having a repetitive frequency of less than 3000 hertz and signals having a repetitive frequency of greater than 3000 hertz.

8. The system of claim 4 wherein the interface comprises:

a blocking circuit for impeding a direct current component of a battery signal from passing through the interface;

a first low pass filter coupled to the blocking circuit for impeding signals from the blocking circuit of a frequency higher that a first cut off frequency from passing through the interface;

a variable attenuator coupled to the first low pass filter for attenuating signals from the low pass filter based on a magnitude of signals from said first low pass filter; and a second low pass filter coupled to an output of the variable attenuator for impeding signals of a frequency greater than the first cut off frequency from passing through the interface.

9. A system for monitoring operation of an engine in power equipment comprising a programmable controller and interface circuitry for monitoring a status of the engine and a battery for starting said engine, said controller programmed to categorize the system into a sequence of operating states based on monitored conditions wherein the operating states comprise:

an initial operating state in which the controller is powered by a battery to determine an operating condition of the engine;

a pre-starting state which the controller transitions to prior to starting of said engine in response in response to a external start signal;

a starting state which the controller transitions to as the engine is starting as indicated by a drop in sensed battery voltage below a threshold due to cranking of a starter;

a post start state which the controller transitions to based on an increase in sensed battery voltage above said threshold due to charging of the battery;

a running state which the controller transitions to from the post start state based on detected electrical noise in the interface circuitry and during which the engine operating time is accumulated by said controller; and a post running state which the controller enters from the running state in response to a cessation of detected electrical noise and which transitions back to the initial operating state after a delay.

10. The system of claim 9 wherein the controller transitions to the starting state from the pre-starting state based on sensed voltage of a power source for providing starting power to crank the engine.

11. The system of claim 10 wherein the controller transitions back to the pre-starting state in the event a drop in sensed voltage from the power source is not sensed for a predetermined minimum amount of time.

12. The system of claim 9 additionally comprises a noise detection circuit coupled to a power source for starting the engine and also coupled to the controller for transmitting a signal indicating the existence of noise due to a running engine to a noise monitoring input of the controller, wherein the controller includes an aid converter for converting the signal at the noise monitoring input to a digital value and further wherein the controller evaluates the digital value based on one or more programmed parameters deemed to indicate a signature of a running engine.

13. A method for monitoring operation of an engine in power equipment having a battery for starting the engine comprising:

from an initial operating state in which battery voltage is available for starting the engine determining starting of said engine in response to a external start signal by sensing first a drop in battery voltage during engine cranking followed by sensing a rise in battery voltage as the engine starts and the battery begins to be charged by a generator coupled to said battery;

accumulating engine run time subsequent to starting of the engine by sensing electrical noise in a detection circuit coupled to the battery due to operation of the engine subsequent to the starting of the engine; and ending accumulation of the engine run time upon a cessation of detected electrical noise.

14. The method of claim 13 wherein the sensing is performed by a noise detection circuit coupled to a power source for starting the engine and also coupled to a programmable controller that monitors a noise monitoring input from the noise detection circuit, wherein the controller converts a signal at the noise monitoring input to a digital value and further wherein the controller evaluates the digital value based on one or more programmed parameters deemed to indicate a signature of a running engine before it accumulates engine run time.

15. The method of claim 14 wherein the noise detection circuit detects electrical noise of having a frequency below a cutoff frequency and wherein the programmed parameters are based on the cutoff frequency.

* * * * *